United States Patent
Rotte et al.

(10) Patent No.: US 10,430,931 B2
(45) Date of Patent: *Oct. 1, 2019

(54) HIGH DYNAMIC RANGE PROCESSING

(71) Applicant: GVBB HOLDINGS S.A.R.L., Luxembourg (LU)

(72) Inventors: Jeroen Rotte, Breda (NL); Dirk Snoeck-Henkemans, Breda (NL); Petrus Gijsbertus Centen, Goirle (NL)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,094

(22) Filed: Mar. 21, 2019

(65) Prior Publication Data
US 2019/0220961 A1 Jul. 18, 2019

Related U.S. Application Data

(63) Continuation of application No. 15/697,187, filed on Sep. 6, 2017, now Pat. No. 10,242,435.

(60) Provisional application No. 62/384,606, filed on Sep. 7, 2016.

(51) Int. Cl.
| | |
|---|---|
| *H04N 9/68* | (2006.01) |
| *G06K 9/00* | (2006.01) |
| *G06T 5/00* | (2006.01) |
| *H04N 5/202* | (2006.01) |
| *H04N 5/235* | (2006.01) |

(52) U.S. Cl.
CPC ............ *G06T 5/009* (2013.01); *H04N 5/202* (2013.01); *H04N 5/2355* (2013.01); *G06T 2207/10024* (2013.01); *G06T 2207/20208* (2013.01)

(58) Field of Classification Search
USPC ....... 382/100, 103, 106, 162, 167, 168, 172, 382/181, 232, 237, 254, 260, 274, 276, 382/299, 305, 312, 166, 218; 348/234, 348/252; 345/690
See application file for complete search history.

(56) References Cited

U.S. PATENT DOCUMENTS

| | | | | |
|---|---|---|---|---|
| 2009/0066816 A1* | 3/2009 | Wakagi | ............. | H04N 5/20 348/234 |
| 2010/0066874 A1* | 3/2010 | Ishiga | ............. | G06T 5/002 348/252 |
| 2014/0218416 A1* | 8/2014 | Suzuki | ............. | G09G 5/10 345/690 |

(Continued)

FOREIGN PATENT DOCUMENTS

WO     2015194101 A1     12/2015

OTHER PUBLICATIONS

International Search Report & Written Opinion issued in PCT/EP2017/072502 dated Dec. 1, 2017.

*Primary Examiner* — Seyed H Azarian
(74) *Attorney, Agent, or Firm* — Arent Fox LLP

(57) ABSTRACT

An apparatus for HDR image processing is provided. The apparatus determines an imaging sensitivity value. The apparatus then compares subsets of imaging information with the determined imaging sensitivity value and applies a gamma correction to each subset of imaging information using a gamma low contrast curve or a gamma high contrast curve based on the comparison to obtain the gamma corrected subset of imaging information.

32 Claims, 12 Drawing Sheets

(56) References Cited

U.S. PATENT DOCUMENTS

| | | | |
|---|---|---|---|
| 2015/0358646 A1* | 12/2015 | Mertens | H04N 1/6058 |
| | | | 382/166 |
| 2016/0117806 A1* | 4/2016 | Hayashi | G06T 5/003 |
| | | | 382/218 |
| 2016/0165256 A1* | 6/2016 | Van Der Vleuten | H04N 9/68 |
| 2017/0251245 A1 | 8/2017 | Kozuka et al. | |

* cited by examiner

HIGH DYNAMIC RANGE PROCESSING

CROSS REFERENCE TO RELATED APPLICATIONS

The current application is a continuation of U.S. application Ser. No. 15/697,187, filed Sep. 6, 2017, which claims priority to U.S. Patent Provisional Application No. 62/384,606, filed Sep. 7, 2016, the entire contents of which are hereby incorporated by reference.

TECHNICAL FIELD

The present disclosure relates generally to image processing, and more particularly, to high dynamic range processing.

BACKGROUND

Display devices, including cameras, computer monitors, mobile telephones, televisions, and personal devices, may include many individual pixels for displaying images and videos. Each pixel may generate a range of colors at a particular point in a display. Together, the pixels may be used to form an image or video by displaying different colors at different intensities or luminance on a display screen.

Many devices display images with a standard dynamic range (SDR). SDR describes the dynamic range of images and videos adjusted using a conventional gamma curve. The conventional gamma curve was based on certain limitations of the cathode ray tube (CRT) and allowed for a maximum luminance 100 candela per square meter ($cd/m^2$). Recently, image capture devices, such as cameras, have begun to support high dynamic range (HDR) imaging, which is a technique that enables a greater dynamic range of luminosity as compared to SDR. HDR may provide higher contrast and brightness characteristics that simulate the human vision. Advances in ways to capture an image must be accompanied by the development and improvement of the methods for displaying the image capture results.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Because of the large dynamic range of HDR images, image processing may need to be adjusted in order to enable users to experience the benefit of HDR images. In an aspect of the disclosure, a method, a computer-readable medium, and an apparatus are provided. The apparatus may be configured to determine an imaging sensitivity value. The apparatus may be configured to compare subsets of imaging information with the determined imaging sensitivity value. The apparatus may be configured to apply a gamma correction to each subset of imaging information using a gamma low contrast curve or a gamma high contrast curve based on the comparison to obtain the gamma corrected subset of imaging information.

Therefore, according to an exemplary embodiment, an image processing system is provided for adjusting luminosity of a high-dynamic range (HDR) image based on imaging sensitivity of a device configured to display the HDR image. In this embodiment, the image processing system includes electronic memory configured to store at least one gamma low contrast curve and at least one a gamma high contrast curve; an imaging apparatus for generating image data of a captured HDR image; an imaging sensitivity determiner configured to determine an imaging sensitivity value of a display device based on a input value of the display device that provides a predetermined output luminance at display device; an image information comparator configured to compare the determined imaging sensitivity value of the display device with a luminance value of the generated image data; a gamma curve selector configured to select the at least one gamma low contrast curve when the luminance value is less than the determined imaging sensitivity value of the display device and select the at least one gamma high contrast curve when the luminance value is greater than the determined imaging sensitivity value of the display device; an image corrector configured to correct the image data of the captured HDR image by applying the selected at least one gamma high contrast curve or the selected at least one gamma low contrast curve to the generated image data to adjust the luminosity of the HDR image; and an image display configured display the adjusted HDR image on the display device.

In another exemplary aspect, an image processing system is provided for adjusting luminosity of a high-dynamic range (HDR) image based on imaging sensitivity of a device configured to display the HDR image. In this aspect, the image processing system includes electronic memory for storing a plurality of gamma contrast curves; an imaging apparatus for generating image data of a captured HDR image; an imaging sensitivity determiner configured to determine an imaging sensitivity value of a display device; an image information comparator configured to compare the determined imaging sensitivity value of the display device with a luminance value of the generated image data to generate a gamma curve selection determination; a gamma curve selector configured to select at least one gamma contrast curve from the plurality of gamma contrast curves based on the generated gamma curve selection determination; and an image corrector configured to correct the image data of the captured HDR image by applying the selected at least one gamma contrast curve to the generated image data to adjust the luminosity of the HDR image.

In yet another exemplary aspect, an image processor is provided for setting a luminosity of an image based on an imaging sensitivity of a display device. In this aspect, the image processor includes a luminance adjustment selector configured to select at least one luminance adjustment modifier by comparing a luminance of a captured image with an imaging sensitivity of a display device to determine an optimal luminance level for the captured image when displayed on the display device; and an image enhancer configured to apply the at least one luminance adjustment modifier to the captured image to generate an enhanced image configured to be displayed on the display device with the optimal luminance level for the display device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
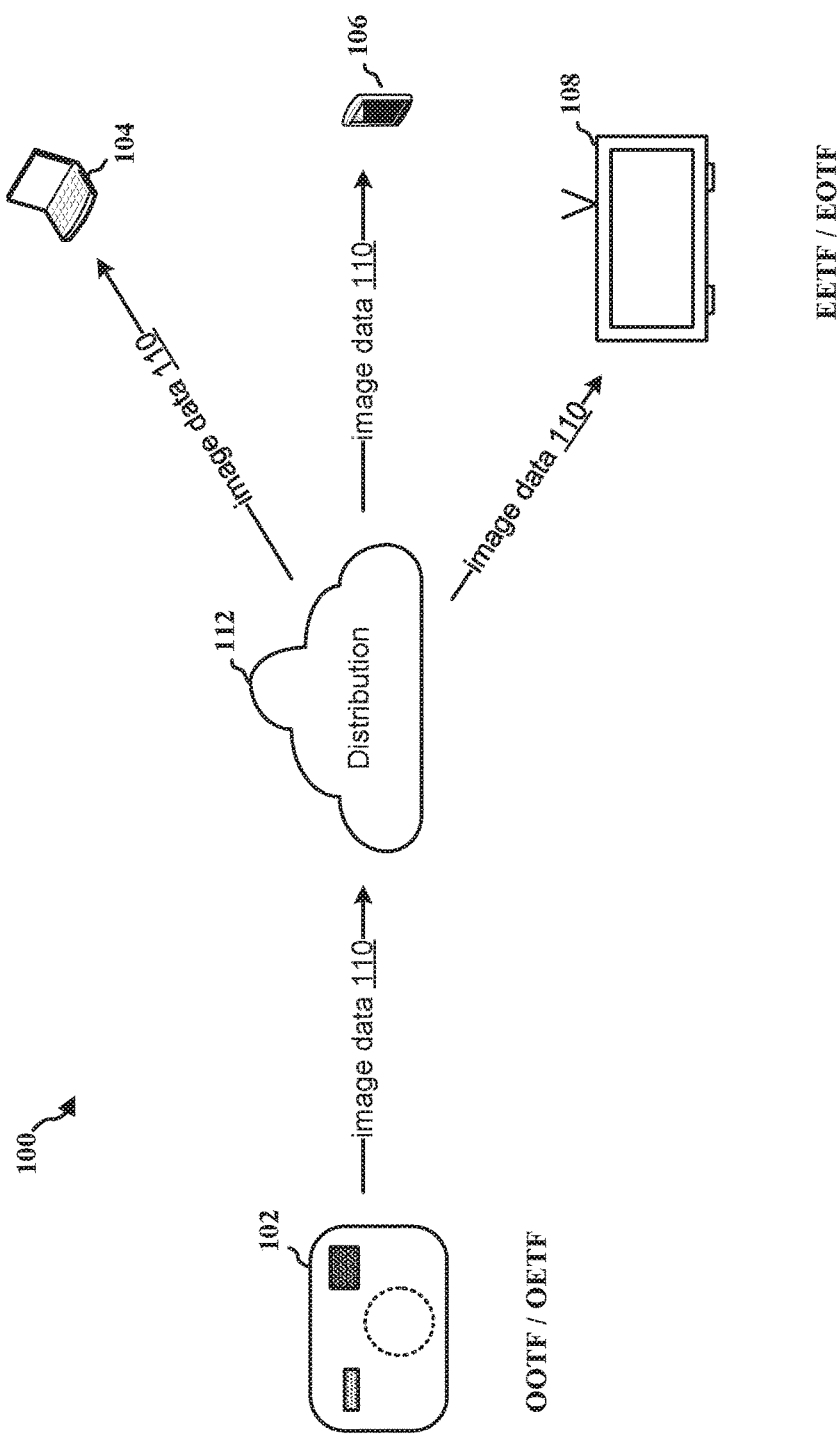
FIG. 1 is a diagram of an image capture and display network according to an exemplary embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of display systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram of an image capture and display network 100. Referring to FIG. 1, a camera 102 (or any other type of image or video capture device) may generate image data 110 (or video data) based on an environment. To capture the image data 110, the camera 102 may utilize an opto-electronic transfer function (OETF) to convert the optical data into electrical signals such as the image data 110. The OETF may be a camera transfer function. The image data 110 may be displayed from the camera 102 itself or may be transmitted via a distribution network 112 to a personal computer 104, a user equipment 106, and/or a television 108, among other display devices.

To display the image data 110, the camera 102 or the other display devices may apply an electrical-optical transfer function (EOTF) that converts the electrical signals of the image data 110 into optical signals for display. In an aspect, the camera 102 or the other display devices may also perform an electrical-electrical transfer function (EETF) before the EOTF. The EETF may map the incoming image data 110 received from the camera 102 into a different set of electronic signals formatted according to the display capabilities of the camera 102 or the other display devices.

A fourth transfer function, known as an opto-optical transfer function (OOTF), may also be utilized. The OOTF function may be used to modify optical signals from one form to another (e.g., modifying the contrast properties of an image). Although this disclosure may refer to images, one of ordinary skill in the art would understand that any methods, techniques, and protocols applied to an image may be similarly applied to videos.

For SDR, transfer functions may be standardized. For example, the SDR OETF is standardized according to ITU-R BT.709 (camera gamma), and the SDR EOTF is standardized under ITU-R BT.1886 (CRT response). Aside from OETF/EOTF, a broadcast camera may also have artistic adjustments on the OETF such as variable gamma and contrast curves. Displays may also have brightness and contrast adjustments.

For HDR, OETF and EOTF transfer functions have been defined. Those include the SMPTE2084 and the Hybrid Log Gamma (HLG) transfer function. SMPTE2084 and HLG transfer functions may be used for OETF or EOTF, which are inverses of one another. In HDR OETF, the camera sensitivity may need to be mapped on a point in the HDR chain. For example, if the camera is set at F12 with a 2000 LUX and 90% reflection, SDR video output would be at 100% or 100 cd/m$^2$.

In another aspect, SMPTE 2084 defines the EOTF with a normalized input of [0,1]. In this aspect, a value of 0.5 at the input provides 100 cd/m$^2$ of display luminance. Experimentally, this has been found to be a good operational point for 100% camera sensitivity. For HLG, an input of 0.5 also results in 100% camera sensitivity.

Because of the wide dynamic range in HDR, additional rendering of the luminosity may be needed for a display to provide the full range contrasts. In an aspect, for HDR, the lowlight portions of an image should appear similar to the lowlight portions of the image in SDR. To properly display the high contrast, an OOTF may be used to keep the response for low light similar to that as in SDR. For example, one may measure the patches of a gamma chart on a reference display in SDR mode. Users may be allowed to adjust the camera OOTF in HDR mode such that the luminosity levels at the monitor output (in cd/m$^2$) for example, are the same.

Figure 2:
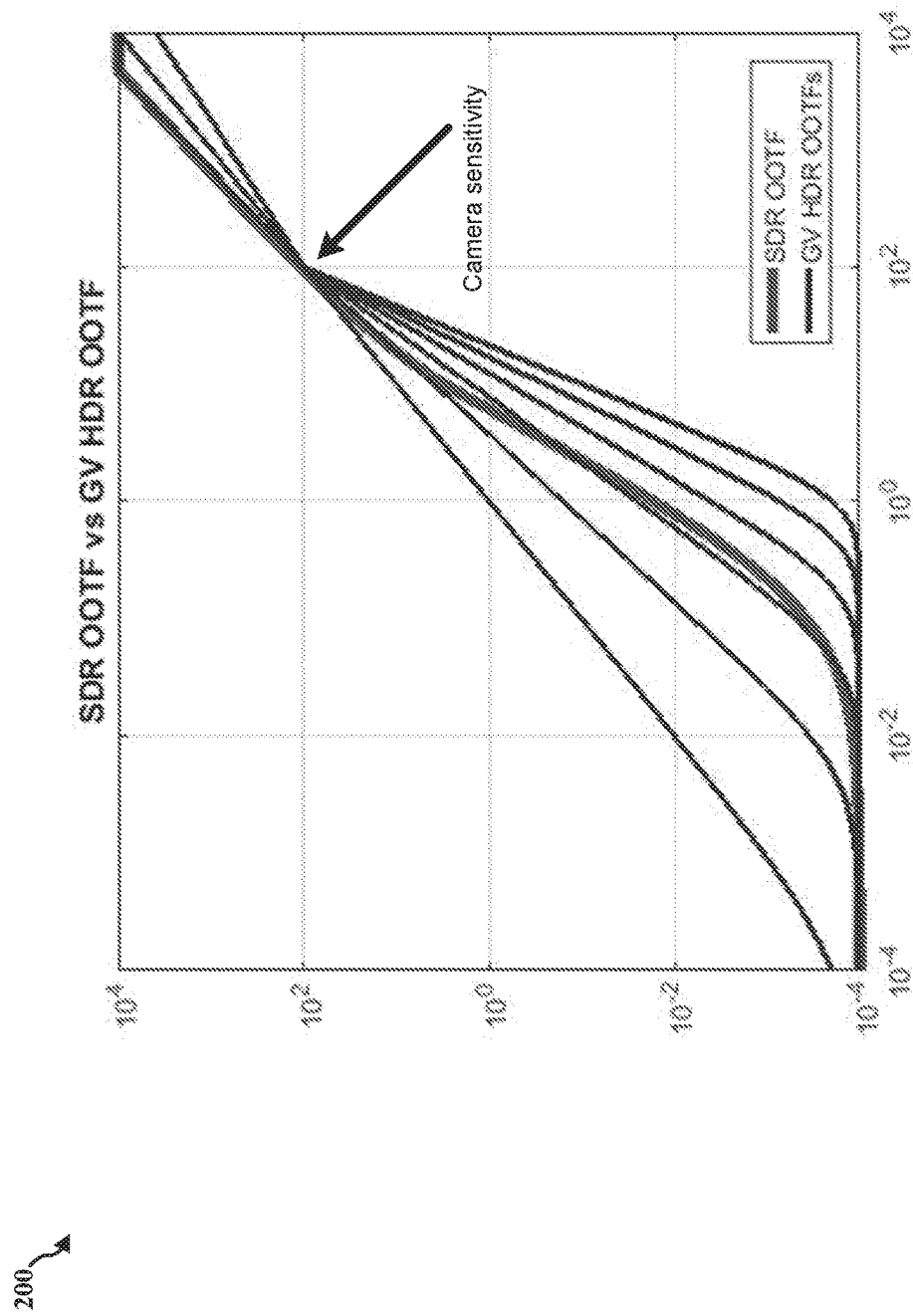
FIG. 2 is a diagram of a first set of OOTF contrast curves according to an exemplary embodiment.

FIG. 2 is a diagram 200 of a first set of OOTF contrast curves. The thicker curve line represents the calculated SDR OOTF curve. The SDR OOTF curve is based on a gamma of 1.2 to 1.4 based on BT1886 (Rec709). The thinner darker curves represent the HDR paddock curves for LDX cameras. The X and Y axis represent units of luminance such as cd/m$^2$.

Figure 3:
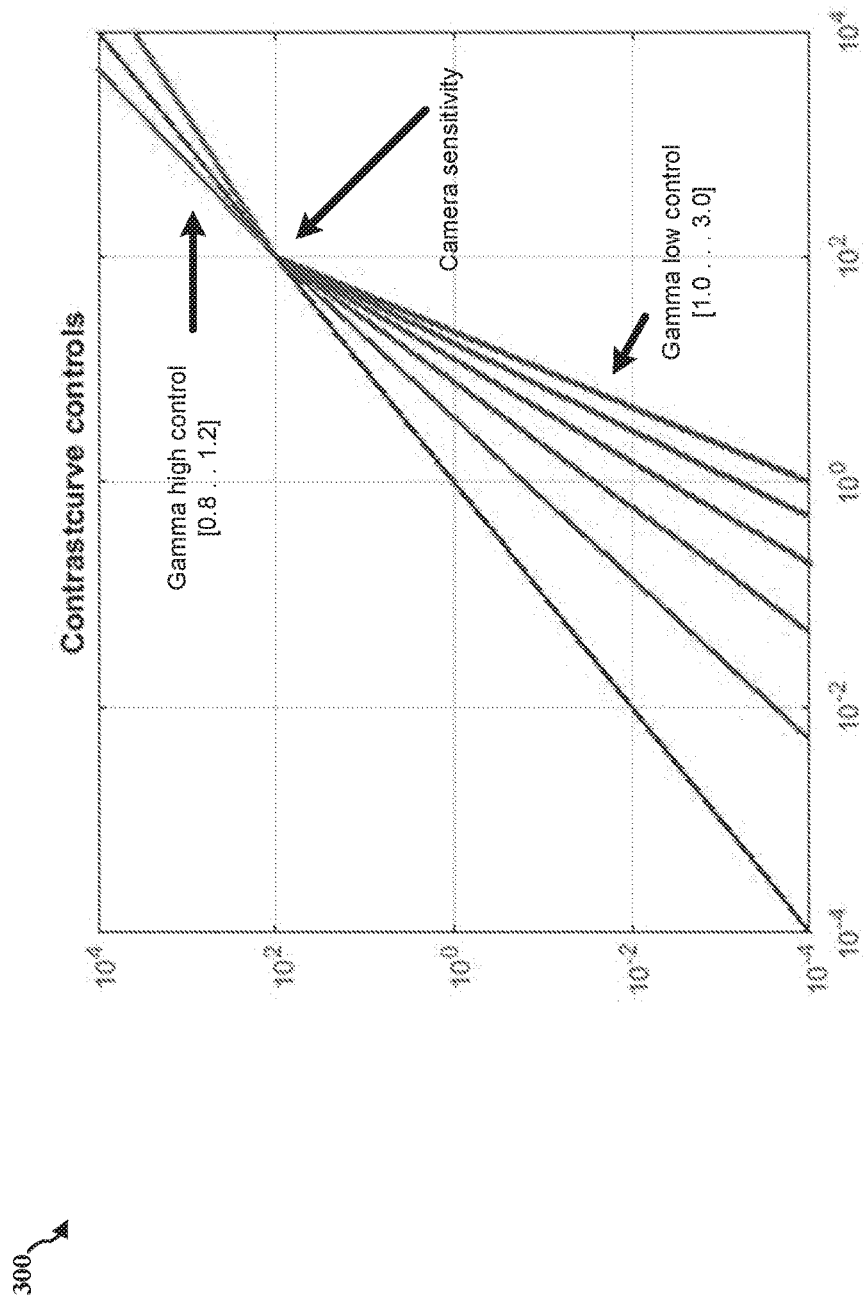
FIG. 3 is a diagram of a second set of OOTF contrast curves according to an exemplary embodiment.

FIG. 3 is a diagram 300 of a second set of OOTF contrast curves. Referring to FIG. 3, a display device (e.g., the camera 102) may have an imaging sensitivity value. The imaging sensitivity value may be 100 cd/m$^2$. The display device may provide different gamma contrast curves depending on whether the imaging information for which a gamma correction is to be applied is associated with a luminance value that is greater or less than the imaging sensitivity value. If the luminance value is less than the imaging sensitivity value, then a gamma low contrast curve may be applied. In an aspect, the gamma low contrast curve may have a slope ranging from [1.0, 3.0]. When the imaging information has a luminosity that is less than the imaging sensitivity value, a gamma value of greater than 1 attenuates the luminosity, while a gamma value of less than 1 amplifies the luminosity. Preferably, the luminosity is attenuated or amplified to match and optimal luminance level for the captured image when it is displayed on the display device.

According to a first exemplary aspect, the imaging sensitivity value can be a defined breakpoint, such as a predetermined luminance value of the display device, for example. However, it should be appreciated that the imaging sensitivity value is not necessarily limited to a predetermined breakpoint. For example, in an alternative aspect, the imaging sensitivity value can be a defined range of luminance values for the display device. In this aspect, the one or more luminance adjustment values (e.g., one or more gamma correction values or curves) can be selected based on the comparison between the luminance value of the captured image and the range of imaging sensitivity values for the display device. Moreover, the imaging sensitivity value can be determined by an imaging sensitivity determiner, for example, a module of the processing as will be described below.

In another aspect, if the imaging information is associated with a luminance value that exceeds the imaging sensitivity value, then a gamma high contrast curve may be applied. The gamma high contrast curve may have a different slope than the gamma low contrast curve. In an aspect, the gamma high contrast curve may have a slope ranging from [0.8, 1.2]. When the imaging information has a luminosity that is greater than the imaging sensitivity value, a gamma value of greater than 1 may amplify the luminosity, while a gamma value of less than 1 attenuates the luminosity.

In an aspect, a gamma high contrast curve may be used to highlight compression. The value of the gamma high contrast curve may be used in metadata to indicate the operating maximum luminance. Other metadata parameters may also be provided.

Figure 4:
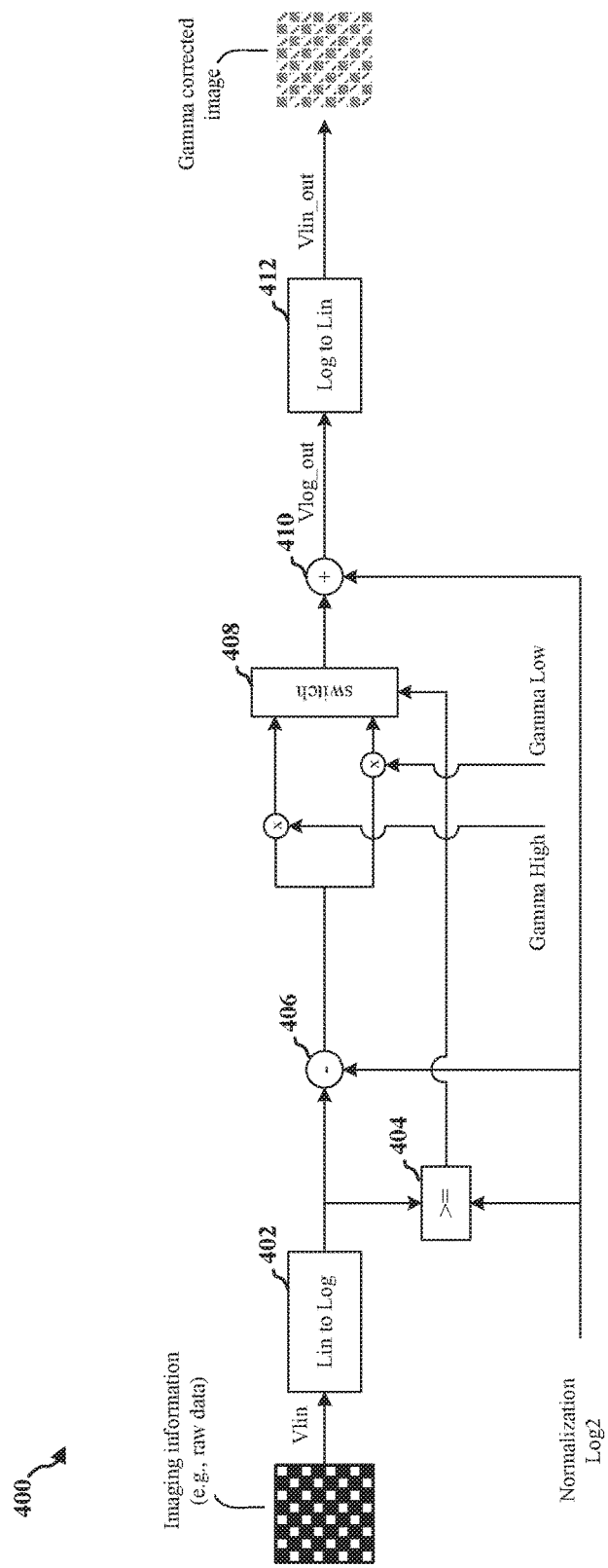
FIG. 4 is a diagram of a first method of high dynamic range processing according to an exemplary embodiment.

FIG. 4 is a diagram 400 of a first method of high dynamic range processing. Referring to FIG. 4, a display device (e.g., a camera or a monitor) may receive imaging information (e.g., raw image data or raw video data). The imaging information may be in the linear domain. To reduce multiplication, quotient, power, and root operations to multiplication, addition, and subtraction operations, the imaging information may be converted from the linear domain to the logarithmic domain. In an aspect, real-time processing by an FPGA, for example, may be quicker after converting the imaging information into the logarithmic domain. A first processor 402 may convert the linear imaging information into logarithmic imaging information—although such conversion is not required for HDR processing. The display device may determine an imaging sensitivity value associated with the display device. In an aspect, the imaging sensitivity value may be an input value that results in an output luminance of 100 cd/m$^2$ at the display device (or the other display device). In another aspect, the imaging sensitivity value may be preconfigured within the display device.

After converting the imaging information into the logarithmic domain, a subset of the imaging information (e.g., luminance information corresponding to one or more pixels) may be compared with the imaging sensitivity value by a comparator 404. In particular, the comparator 404 of the display device may determine whether the subset of imaging information is associated with a luminance that is greater than the imaging sensitivity value. The result of the comparison may be used to determine whether to apply a gamma high contrast curve or a gamma low contrast curve on the subset of imaging information. The display device may subtract 406 from the subset of imaging information a normalization value (which may be equal to the imaging sensitivity value). The difference may be subjected to a gamma high contrast curve and/or a gamma low contrast curve. In an aspect, if the subset of imaging information is associated with a luminance that is greater than the imaging sensitivity value, then the normalized subset of imaging information subjected to a gamma high contrast curve is selected via a switch 408. In another aspect, if the subset of imaging information is associated with a luminance that is less than the imaging sensitivity value, then the normalized subset of imaging information subjected to a gamma low contrast curve is selected via the switch 408. The result of the selection from the switch 408, which may be referred to as an intermediate subset of imaging information, may be added to the normalization value (e.g., with an adder 410) to generate a gamma corrected subset of imaging information.

Thus, it should be appreciated that the switch 408 can be controlled by the processing system of the disclosed system and is configured to selected the luminance adjustment modifier (e.g., the particular gamma adjustment value and/or gamma contrast curve) by comparing a luminance of the captured image with the imaging sensitivity of the display device to determine an optimal luminance level for the captured image when the image is ultimately displayed on the display device.

In an exemplary aspect, the display device may convert the gamma corrected subset of imaging information from the logarithmic domain back to the linear domain via a second processor 412 (which may be the same as the first processor 402). The display device may include an image corrector or image enhancer that can generate a gamma corrected image by repeatedly performing the aforementioned operations on all of the subsets of imaging information until the operation is performed on the entire set of imaging information. In an aspect, the gamma corrected image may have been subjected to both a gamma low contrast curve and a gamma high contrast curve and/or multiple variations of the gamma low contrast curves and gamma high contrast curves. Although not shown in FIG. 4, the system 400 includes an image display for displaying the corrected/adjusted image on a display device, i.e., displaying the gamma corrected image.

Figure 5:
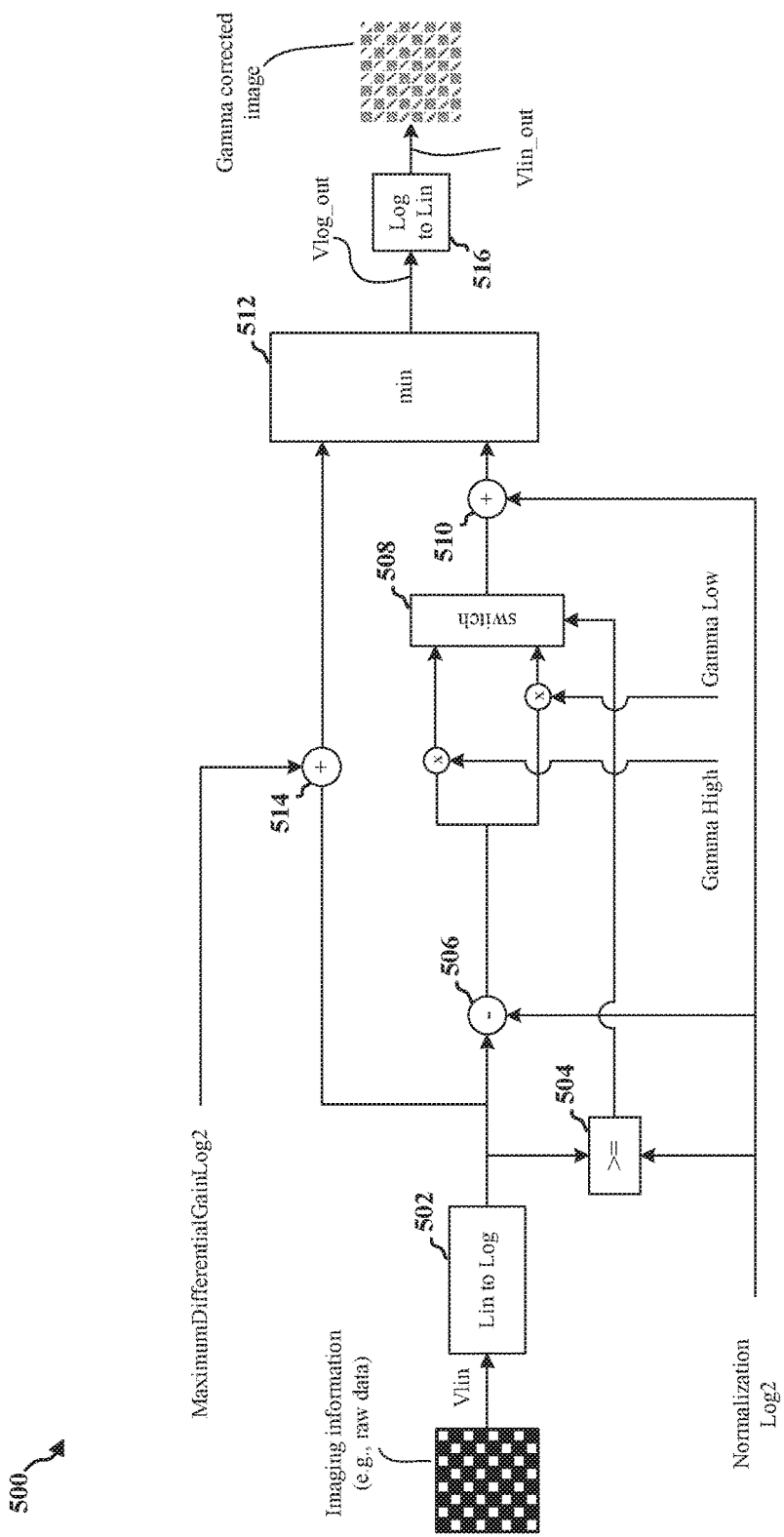
FIG. 5 is a diagram of a second method of high dynamic range processing with noise consideration according to an exemplary embodiment.

FIG. 5 is a diagram 500 of a second method of high dynamic range processing with noise consideration. In some instances, the amplification introduced by the gamma contrast curves may result in excessive noise to the imaging information. As such, any amplification may be limited by a maximum differential gain. Referring to FIG. 5, a display device (e.g., a camera or a monitor) may receive imaging information (e.g., raw image data or raw video data). The imaging information may be in the linear domain. To reduce multiplication, quotient, power, and root operations to multiplication, addition, and subtraction operations, the imaging information may be converted from the linear domain to the logarithmic domain. In an aspect, real-time processing by an FPGA, for example, may be quicker after converting the imaging information into the logarithmic domain. A first processor 502 may convert the linear imaging information into logarithmic imaging information—although such conversion is not required for HDR processing. The display device may determine an imaging sensitivity value associated with the display device. In an aspect, the imaging sensitivity value may be an input value that results in an output luminance of 100 cd/m$^2$ at the camera (or the other display device). In another aspect, the imaging sensitivity value may be preconfigured within the display device.

After converting the imaging information into the logarithmic domain, a subset of the imaging information (e.g., luminance information corresponding to one or more pixels) may be compared with the imaging sensitivity value by a comparator 504. In particular, the comparator 504 of the display device may determine whether the subset of imaging information is associated with a luminance that is greater than the imaging sensitivity value. The result of the comparison may be used to determine whether to apply a gamma high contrast curve or a gamma low contrast curve on the subset of imaging information. The display device may subtract 506 from the subset of imaging information a normalization value. The difference may be subjected to a gamma high contrast curve and/or a gamma low contrast curve. In an aspect, if the subset of imaging information is associated with a luminance that is greater than the imaging sensitivity value, then the normalized subset of imaging information subjected to a gamma high contrast curve is selected via a switch 508. In another aspect, if the subset of imaging information is associated with a luminance that is less than the imaging sensitivity value, then the normalized subset of imaging information subjected to a gamma low contrast curve is selected via the switch 508. The result of the selection from the switch 508, which may be referred to as an intermediate subset of imaging information, may be added to the normalization value (e.g., with an adder 510) to generate a second intermediate subset of imaging information. In an aspect, a second adder 514 may be used to add the subset of imaging information with a maximum differential gain value to generate a maximum total value. A second comparator 512 may compare the maximum total value with the second intermediate subset of imaging information and select the smaller of the two inputs to use as the gamma corrected subset of imaging information. By utilizing the smaller of the two inputs, the display device may use the maximum differential gain value to limit the amount of noise in the gamma corrected subset of imaging information. Subsequently, the display device may convert the gamma corrected subset of imaging information from the logarithmic domain back to the linear domain via a second processor 516 (which may be the same as the first processor 502). The display device may generate a gamma corrected image by repeatedly performing the aforementioned operations on all of the subsets of imaging information until the operation is performed on the entire set of imaging information. In an aspect, the gamma corrected image may have been subjected to both a gamma low contrast curve and a gamma high contrast curve and/or multiple variations of the gamma low contrast curves and gamma high contrast curves.

In an aspect, the HDR processing methods discussed with respect to FIGS. 4 and 5 may represent a relative system. Imaging sensitivity may be normalized to a certain output value, and the display device may generate values relative to the normalized sensitivity value. Subsequently, gamma low and gamma high contrast curves may be used to modify the generated values.

Figure 6:
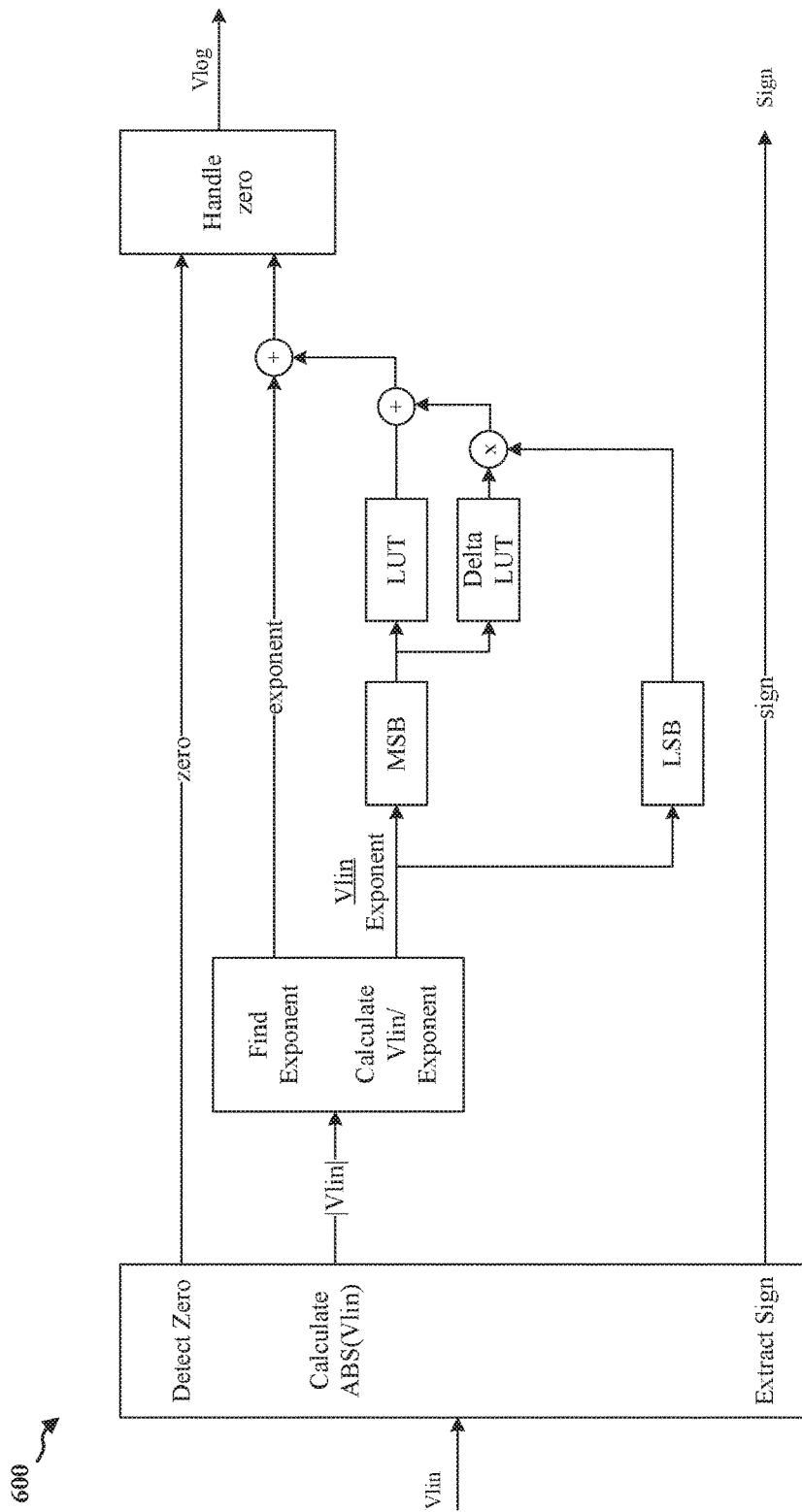
FIG. 6 is a diagram of a method for converting linear values into logarithmic values according to an exemplary embodiment.
Figure 8:
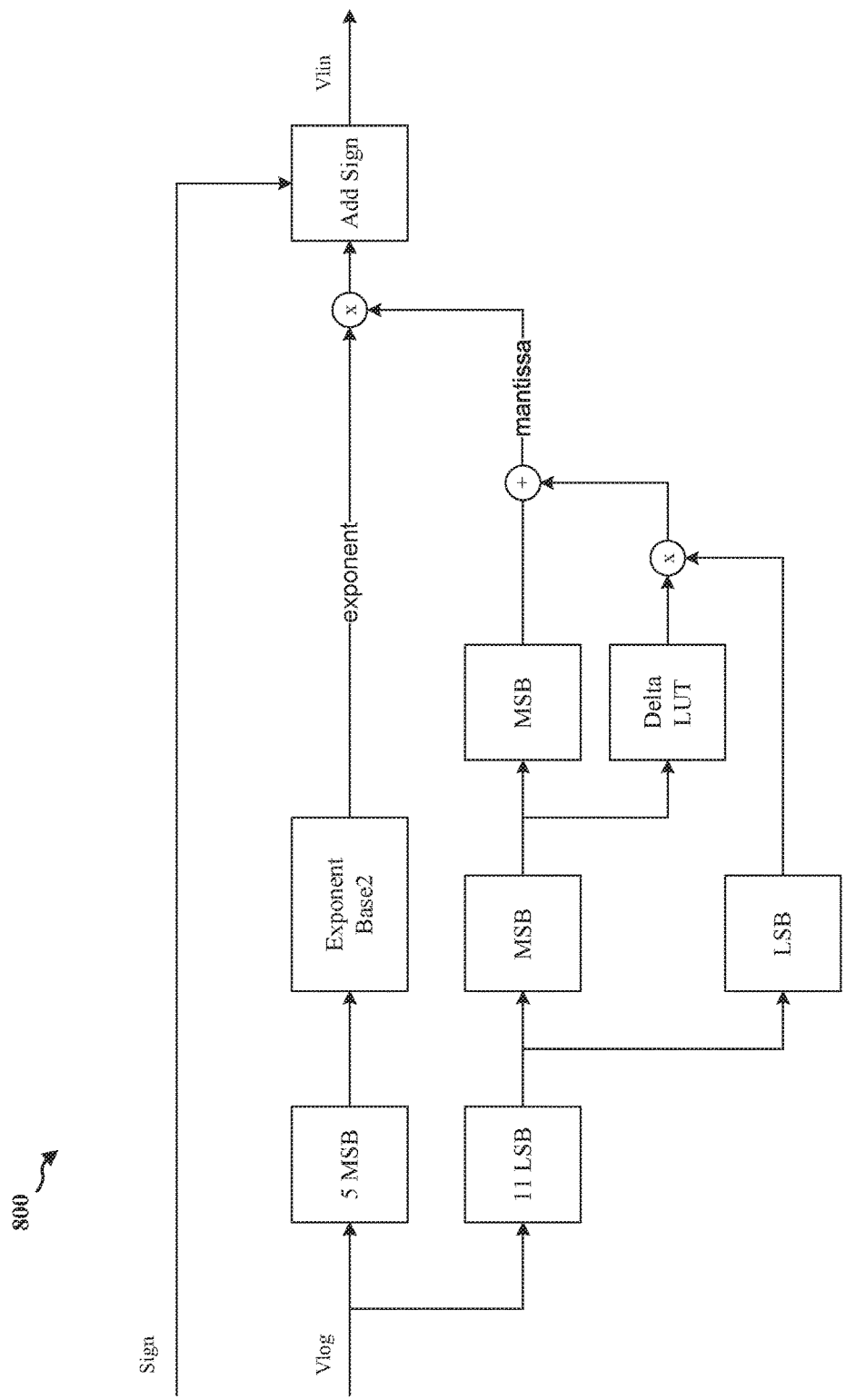
FIG. 8 is a diagram of a method for converting logarithmic values into linear values according to an exemplary embodiment.

Different methods or techniques may be used to convert the imaging information from the linear domain to the logarithmic domain and vice versa. FIGS. 6 and 8 illustrate methods for linear to logarithmic conversions and vice versa. Other methods or techniques may also be used.

FIG. 6 is a diagram 600 of a method for converting linear values into logarithmic values. The operations in FIG. 6 may be performed by one or more processors. For example, referring to FIG. 6, the processor may receive a linear value (Vlin). The processor may determine if the linear value is zero. If the linear value is zero, then a corresponding logarithmic value is provided by a handle zero component. If the linear value is non-zero, the processor may calculate the absolute value of the linear value and extract the sign of the linear value. The processor may determine an exponent associated with the linear value and calculate the ratio of the linear value divided by the exponent. The results of the ratio may be inputted into a most significant bit (MSB) component and a least significant bit (LSB) component. The output of the MSB component may be provided to a lookup table (LUT) and a delta LUT. The output of the LSB component may be multiplied with the output from the delta LUT component. The product may be added to the output of the LUT component, and the sum may be added to the exponent to generate a second sum. The second sum may be the logarithmic value.

Figure 7:
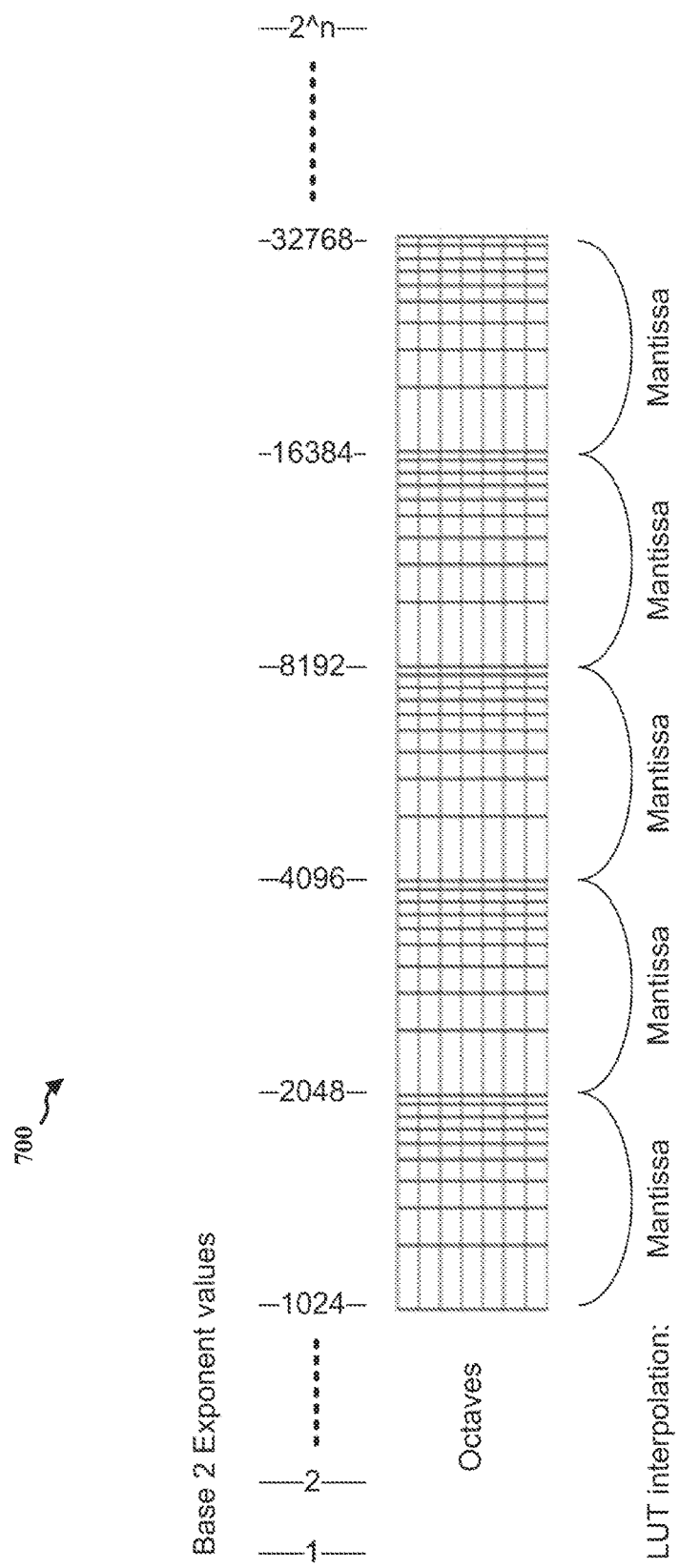
FIG. 7 is a diagram illustrating base 2 exponent values according to an exemplary embodiment.

The design approach is to first determine the exponent for a base2 log value by comparing $2^1, 2^2, 2^3, \ldots 2^n$. When the exponent is found, the interpolation within each octave is identical. The mantissa in the octave is found by dividing the linear value with the determined exponent. This is a shift operation because it is a base2 operation. After division with the exponent, the result is always a mantissa value between 1 and 2 (with 2 being the base). The interpolation value may be a value between 1 and 2, and the interpolation value may be provided to the LUT. To achieve higher precision, the LUT may use linear interpolation between the point in the LUT with a LUT holding delta values to the next point in the LUT. FIG. 7 is a diagram 700 illustrating base 2 exponent values.

The absolute precision of the interpolation with the LUT for each octave is degrading, but because the function is used for images or video, the relative precision is more important. In an aspect, a 1 percent limit may be used to be non-visible.

FIG. 8 is a diagram 800 of a method for converting logarithmic values into linear values. The operations in FIG. 8 may be performed by one or more processors. Referring to FIG. 8, a logarithmic to linear conversion may work similar as the linear to logarithmic conversion. The logarithmic value (Vlog) may be an unsigned 16 bit value of which 5 bits are the exponent and 11 bits are the mantissa. A 5 bit exponent value may hold $2^5$ or 32 bits, and the mantissa may hold 11 bits for precision within the octave. As shown in FIG. 8, the exponent are the mantissa are separated by extracting the 5 MSBs and the 11 LSBs of the logarithmic value. The mantissa may be used as an input for a LUT, which may hold n points within the octave. The amount of MSBs to extract from the mantissa may be log n/log 2, $$\frac{\log n}{\log 2}.$$

For 64 points in the LUT, 5 bits may be extracted. The remaining bits from the mantissa (e.g., 6 in this example) may be linear interpolations between the two LUT points. The interpolation uses the value stored in the delta LUT, which is the delta to the next point in the LUT. Having the delta LUT may increase processing speed. Subsequently, the results, as shown in FIG. 8, are used to generate the linear value (Vlin).

Figure 9:
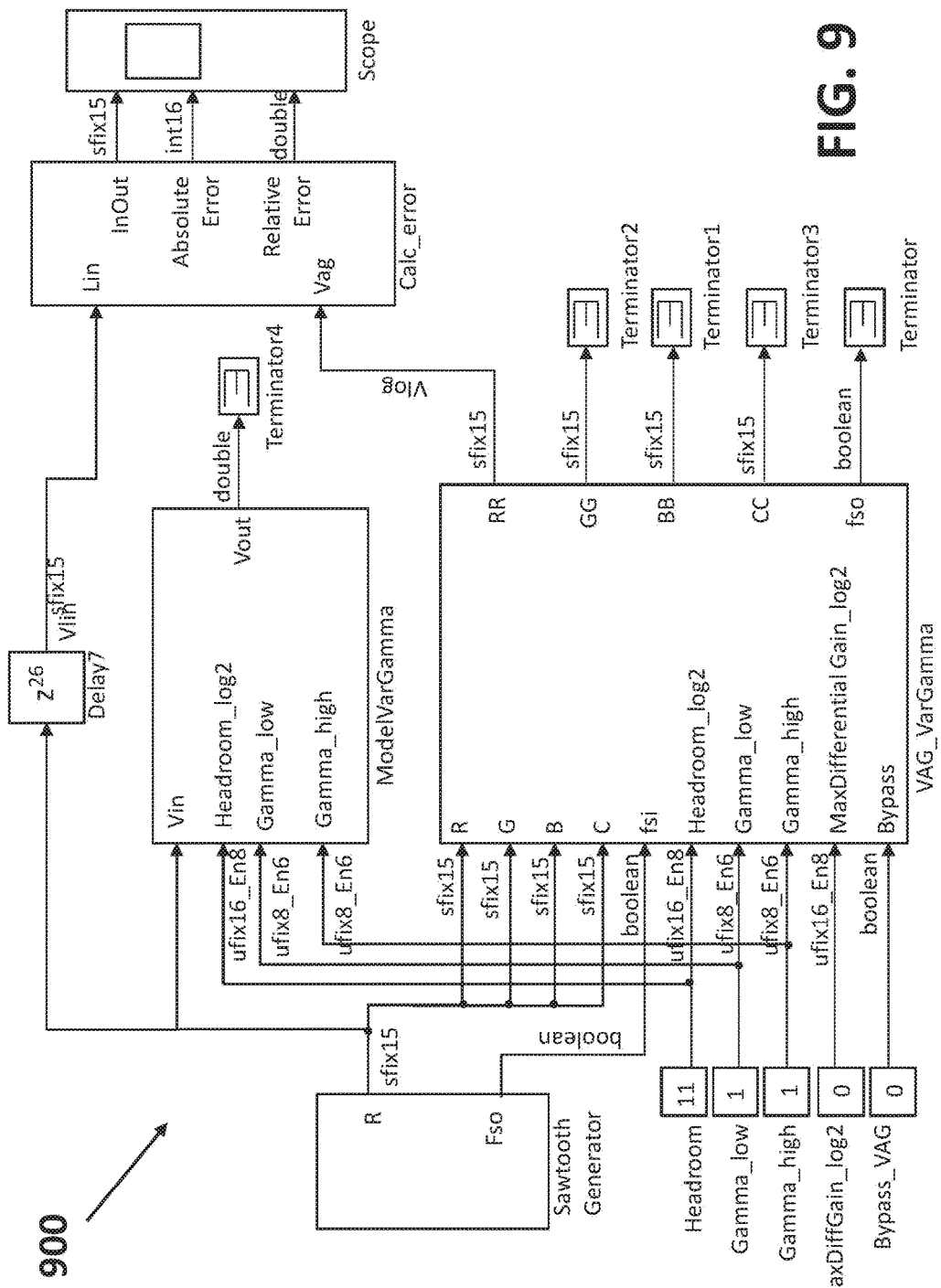
FIG. 9 illustrates a Matlab implementation of the HDR processing techniques according to an exemplary embodiment.

FIG. 9 illustrates a Matlab implementation 900 of the HDR processing techniques. Referring to FIG. 9, Initialization_VarGamma.m may be used to calculate the values needed in the LUT, tb_VarGamma.slx may be a test bench for the linear to logarithmic conversion, Var Gamma, and logarithmic to linear conversion, and GV_LIB_LinLogLin-.slx may be library functions for Lin2Log and Log2Lin. The HDLCoder may be used to generate code from block 'VAG_VarGamma.' The Matlab implementation may also use the following input/output port list shown in Table 1.

TABLE 1

| Input-Output Port List | | | |
| --- | --- | --- | --- |
| Pin name | Format | Type | Description |
| R, G, B, C | ufix(1, 15, 0) | Input | Video inputs-4 channels to enable 4k |
| RR, GG, BB, CC | ufix(1, 15, 0) | Output | Video outputs |
| Headroom_log2 | ufix(1, 16, 8) | Control input | Normalization value for the gamma high and gamma low transition point |
| Gamma_low | ufix(0, 8, 6) | Control input | Gamma low value |

TABLE 1-continued

| Input-Output Port List | | | |
| --- | --- | --- | --- |
| Pin name | Format | Type | Description |
| Gamma_high | ufix(0, 8, 6) | Control input | Gamma high value |
| Bypass | Boolean | Control input | Bypass function (delay is not compensated due to resource reduction) |
| FSi | Boolean | Timing input | FrameSync In |
| FSo | Boolean | Timing output | FrameSync Out |

The initialization script may hold parameters for input and output formats and the LUT sizes that are fully parametrized for Matlab/Simulink. During code generation, these should be set to the desired values because the HDLcoder may not be generating generics.

Figure 10:
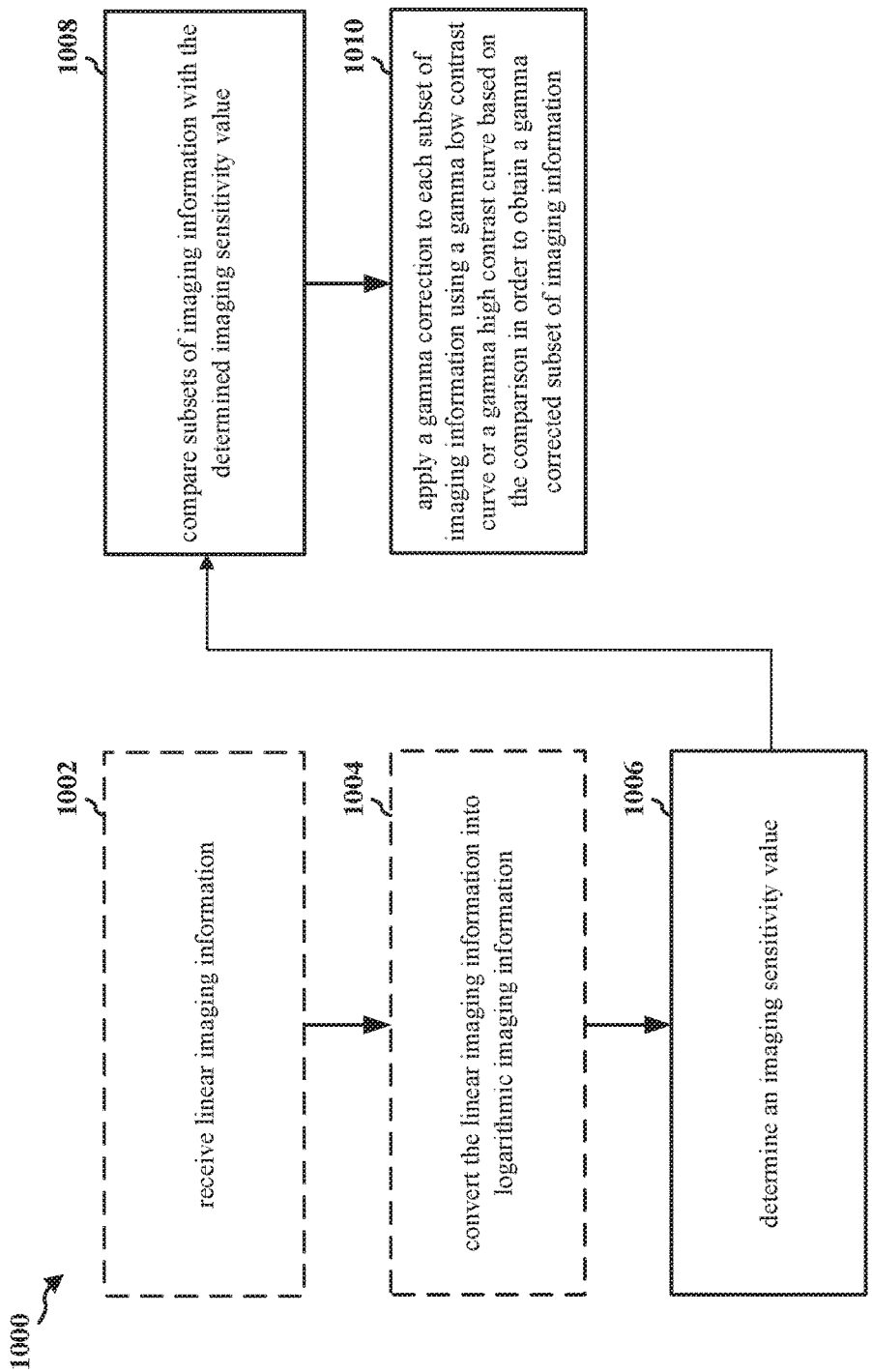
FIG. 10 is a flowchart of a method of HDR processing according to an exemplary embodiment.

FIG. 10 is a flowchart 1000 of a method of HDR processing. The method may be performed by an apparatus (e.g., a processor, a display device, the apparatus 1102/1102'). At 1002, the apparatus may receive linear imaging information. The imaging information may indicate luminance values for one or more pixels.

At 1004, the apparatus may convert the linear imaging information into logarithmic imaging information. For example, the luminance values may be converted from a linear domain to a logarithmic domain.

At 1006, the apparatus may determine an imaging sensitivity value. For example, the imaging sensitivity value may be preconfigured. The apparatus may determine the imaging sensitivity value by looking up the value in a memory location and extracting the value. For example, the imaging sensitivity value may be 100 cd/m$^2$.

At 1008, the apparatus may compare subsets of imaging information with the determined imaging sensitivity value. The imaging information may be the converted logarithmic imaging information. Subsets of imaging information may correspond to luminance values for one or more pixels. The apparatus may determine whether the imaging information indicates a luminance value greater than or equal to the imaging sensitivity value.

At 1010, the apparatus may apply a gamma correction to each subset of imaging information using a gamma low contrast curve or a gamma high contrast curve based on the comparison in order to obtain a gamma corrected subset of imaging information.

Figure 11:
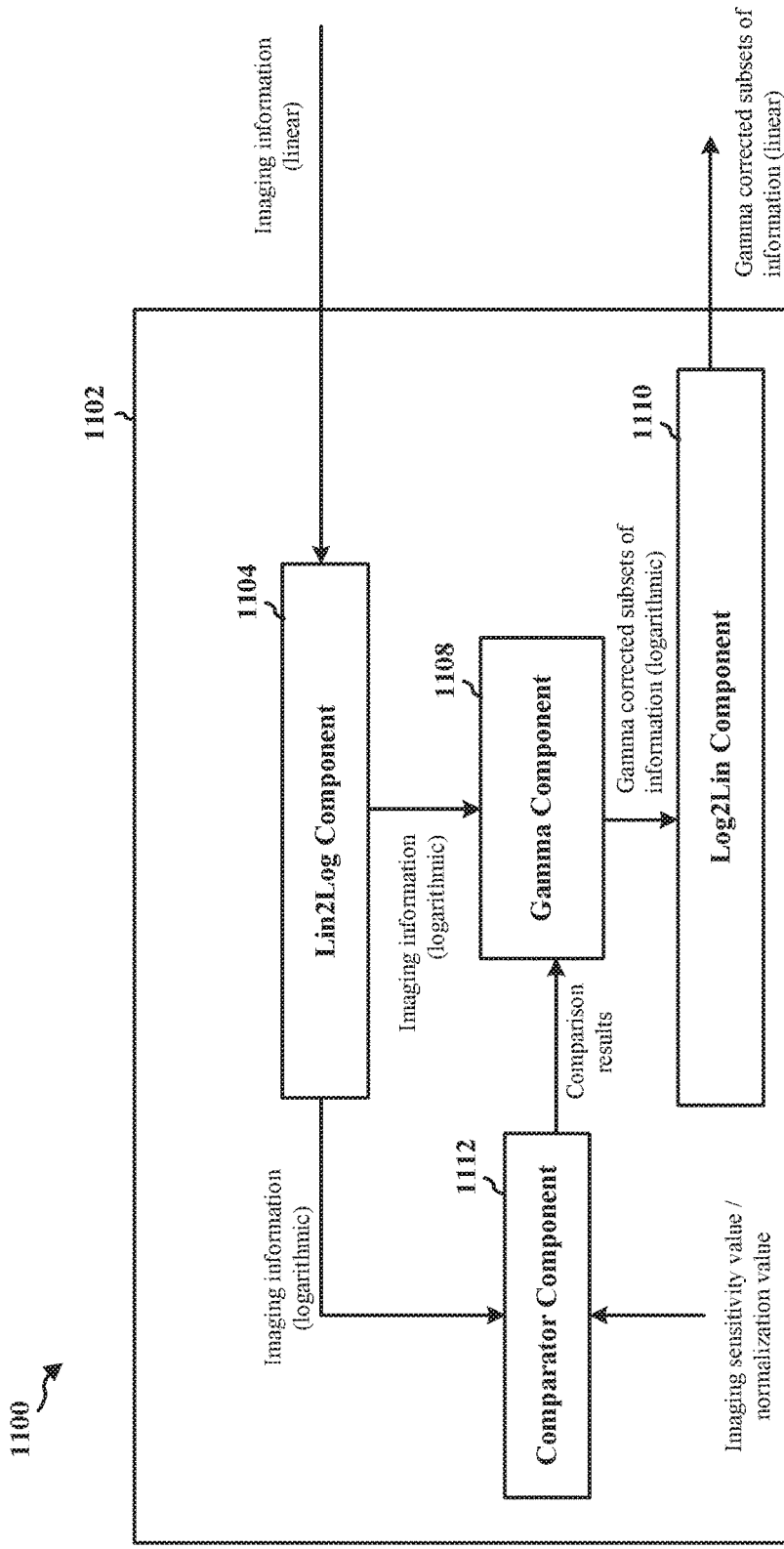
FIG. 11 is a conceptual data flow diagram illustrating the data flow between different components of the disclosed system according to an exemplary embodiment.

FIG. 11 is a conceptual data flow diagram 1100 illustrating the data flow between different components in an exemplary apparatus 1102. The apparatus may be a processor or a display device. The apparatus includes a Lin2Log component 1104, a comparator component 1106, a gamma component 1108, and a Log2Lin component 1110. The gamma component 1108 may be configured to determine an imaging sensitivity value. The comparator component 1106 may be configured to compare subsets of imaging information with the determined imaging sensitivity value. The gamma component 1108 may be configured to apply a gamma correction to each subset of imaging information using a gamma low contrast curve or a gamma high contrast curve based on the comparison to obtain the gamma corrected subset of imaging information. For example, the gamma component 1108 can include computer/electronic memory for storing one or more gamma low contrast curves and a gamma high contrast curves according to the exemplary embodiment.

Moreover, in an exemplary aspect, the imaging sensitivity value may be an input value that results in an output luminance of 100 cd/m² at the apparatus. In another aspect, the imaging sensitivity value may be preconfigured within the apparatus. In another configuration, the apparatus may include an interface (e.g., a bus interface). The interface may be configured to receive linear imaging information. In this configuration, the Lin2Log component 1104 may be configured to convert the linear imaging information into logarithmic imaging information. The logarithmic imaging information may be the imaging information. In another configuration, the comparator component 1106 may be configured to compare the subsets of imaging information by determining whether each subset of imaging information corresponds to a first luminance that is greater than a second luminance associated with the imaging sensitivity value. In another configuration, the gamma component 1108 may be configured to apply the gamma correction by normalizing the subset of imaging information based on a normalization value, by selecting the gamma low contrast curve if the subset of imaging information corresponds to a first luminance that is less than a second luminance associated with the imaging sensitivity value, and by selecting the gamma high contrast curve if the subset of imaging information corresponds to a third luminance that is greater than the second luminance associated with the imaging sensitivity value. In this configuration, the selected gamma low contrast curve or the selected gamma high contrast curve may be applied to the normalized subset of imaging information to obtain an intermediate subset of imaging information. In another aspect, the normalization value may be equal to the imaging sensitivity value. In another configuration, the gamma component 1108 may be configured to apply the gamma correction by adding the normalization value to the intermediate subset of imaging information to obtain the gamma corrected subset of imaging information. In another configuration, the Log2Lin component 1110 may be configured to convert the gamma corrected subset of imaging information from a logarithmic format to a linear format. In another configuration, the gamma component 1108 may be configured to apply the gamma correction by computing a maximum total value by adding the subset of imaging information with a maximum differential gain value and by computing a second intermediate subset of imaging information by adding the normalizing value to the intermediate subset of imaging information. The gamma corrected subset of imaging information may be a smaller of the maximum total value or the second intermediate subset of imaging information. In another configuration, the gamma component 1108 may be configured to generate a gamma corrected image by accumulating gamma corrected subsets of imaging information. The gamma corrected image may have been subjected to both the gamma low contrast curve and the gamma high contrast curve.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
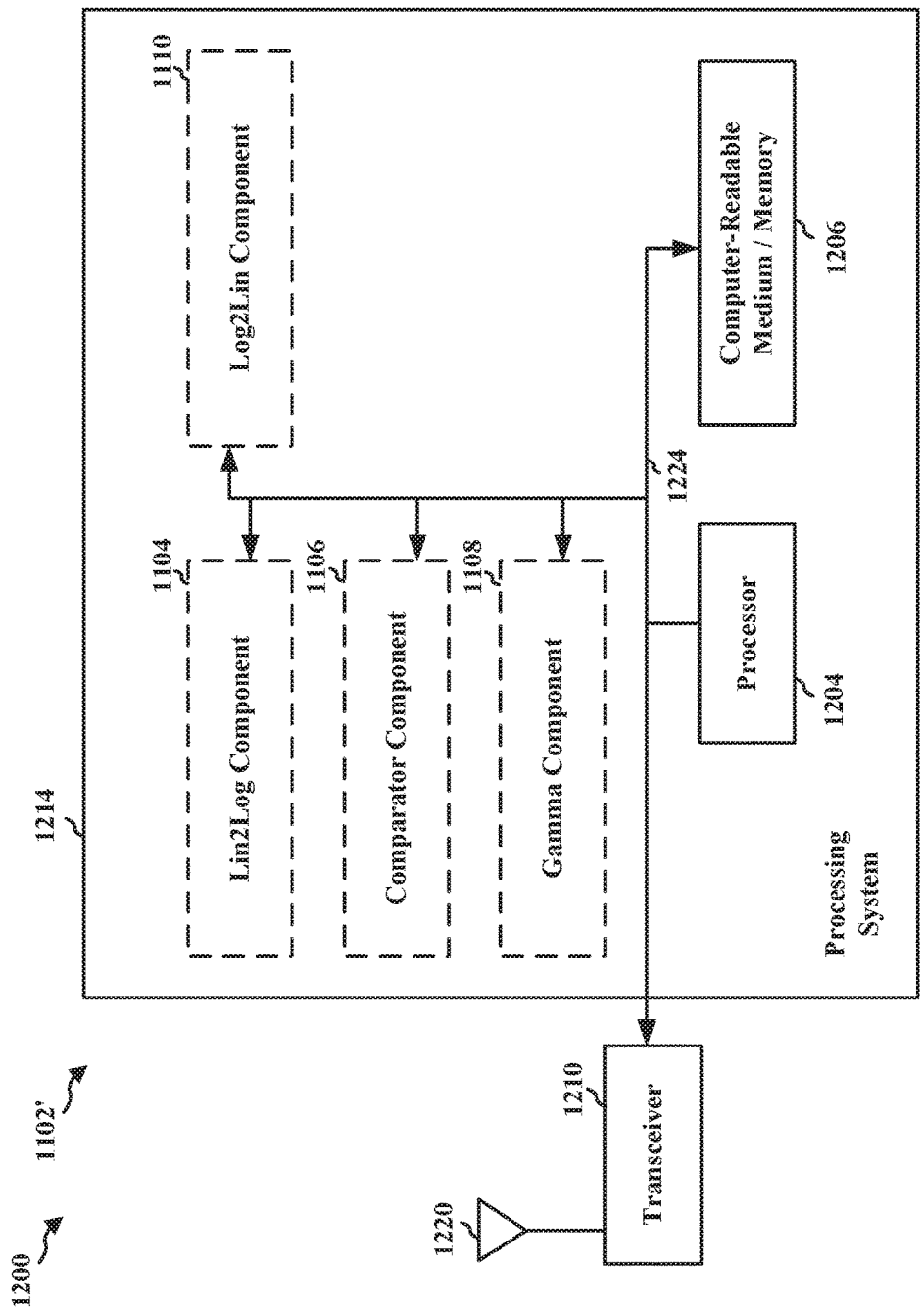
FIG. 12 is a diagram illustrating an example of a hardware implementation for an apparatus employing a processing system according to an exemplary embodiment.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 is configured to communicate with various other apparatus over a transmission medium. The transceiver 1210 receives a signal from the one or more antennas 1220, extracts information from the received signal, and provides the extracted information to the processing system 1214 (e.g., the Lin2Log component 1104). In addition, the transceiver 1210 receives information from the processing system 1214, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of a display device and may include memory and one or more processors coupled to the memory.

In one configuration, the apparatus 1102/1102' for image processing is configured to determine an imaging sensitivity value (i.e., an imaging sensitivity determiner). The apparatus may include image information comparator for comparing subsets of imaging information with the determined imaging sensitivity value. The apparatus may include an image corrector or image enhancer for applying a gamma correction to each subset of imaging information using a gamma low contrast curve or a gamma high contrast curve based on the comparison to obtain the gamma corrected subset of imaging information. In an aspect, the imaging sensitivity value may be an input value that results in an output luminance of 100 cd/m² at the apparatus. In another aspect, the imaging sensitivity value may be preconfigured within the apparatus.

In another configuration, the apparatus may include a receiver for receiving linear imaging information. In this configuration, the apparatus may include a converter for converting the linear imaging information into logarithmic imaging information. The logarithmic imaging information may be the imaging information. In another configuration, the image information comparator for comparing the subsets of imaging information may be configured to determine whether each subset of imaging information corresponds to a first luminance that is greater than a second luminance associated with the imaging sensitivity value. In another configuration, the image corrector/enhancer for applying the gamma correction may be configured to normalize the subset of imaging information based on a normalization value, to select the gamma low contrast curve if the subset of imaging information corresponds to a first luminance that is less than a second luminance associated with the imaging sensitivity value, and to select the gamma high contrast curve if the subset of imaging information corresponds to a third luminance that is greater than the second luminance associated with the imaging sensitivity value. In this configuration, the selected gamma low contrast curve or the selected gamma high contrast curve may be applied to the normalized subset of imaging information to obtain an intermediate subset of imaging information. In another aspect, the normalization value may be equal to the imaging sensitivity value. In another configuration, the image corrector/enhancer for applying the gamma correction may be configured to add the normalization value to the intermediate subset of imaging information to obtain the gamma corrected subset of imaging information. In another configuration, the apparatus may include a converter for converting the gamma corrected subset of imaging information from a logarithmic format to a linear format. In another configuration, the image corrector/enhancer for applying the gamma correction may be configured to compute a maximum total value by adding the subset of imaging information with a maximum differential gain value and to compute a second intermediate subset of imaging information by adding the normalizing value to the intermediate subset of imaging information. The gamma corrected subset of imaging information may be a smaller of the maximum total value or the second intermediate subset of imaging information. In another configuration, the apparatus may include image corrector/enhancer for generating a gamma corrected image by accumulating gamma corrected subsets of imaging information. The gamma corrected image may have been subjected to both the gamma low contrast curve and the gamma high contrast curve.

The aforementioned components of the disclosed system may be one or more of the aforementioned components of the apparatus 1102 and/or the processing system 1214 of the apparatus 1102' configured to perform the functions recited above. The processing system 1214 may include one or more processor, switches, comparators, mathematical logic units, and/or controllers. For example, determiner for determining an imaging sensitivity value may include the processing system 1214 and/or memory 1206. The image information comparator for comparing subsets of imaging information may include the processing system 1214. The image corrector/enhancer for applying a gamma correction may include the processing system 1214. The receiver for receiving linear imaging information may include a transceiver 1210 and/or a bus interface. The converter for converting the gamma corrected subset of imaging information may include the processing system 1214. The image corrector/enhancer for generating a gamma corrected image may include the processing system 1214.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function under 35 U.S.C. § 112(f) unless the element is expressly recited using the phrase "means for."

What is claimed:

1. An image processor for generating an enhanced image for display on a display device with adjusted contrast, the image processor comprising:

an imaging apparatus configured to generate image data of a captured image;

an imaging sensitivity determiner configured to determine at least one imaging sensitivity value of a display device based on a input value of the display device that provides a predetermined output luminance at the display device;

an image converter configured to convert the generated image data of the captured image from a linear domain to a logarithmic domain;

a luminance adjustment selector configured to compare a subset of the converted image data with the determined at least one imaging sensitivity of the display device to select at least one luminance adjustment modifier configured to set a desired luminance level for the captured image when displayed on the display device;

a gamma contrast curve selector configured to select, based on the selected at least one luminance adjustment modifier, at least one gamma low contrast curve when a luminance value of the subset of the converted image data is less than the at least one imaging sensitivity and at least one gamma high contrast curve when the luminance value of the subset of the converted image data is greater than the at least one imaging sensitivity;

an image enhancer configured to correct the converted image data of the captured image by applying the selected at least one gamma high contrast curve or the selected at least one gamma low contrast curve to the converted image data to enhance the captured image by adjusting a contrast of the converted image data based on the applied contrast curve; and an image display configured to display the enhanced captured image on the display device.

2. The image processor of claim 1, wherein the imaging sensitivity determiner is configured to determine the at least one imaging sensitivity value of the display device when the input value results in the predetermined output luminance as a set breakpoint of candela per square meter ($cd/m^2$) at the display device.

3. The image processor of claim 2, wherein the set breakpoint is 100 candela per square meter ($cd/m^2$) at the display device.

4. The image processor of claim 1, wherein the gamma contrast curve selector is configured to compare the luminance value of the subset of the converted image data with a luminance value associated with the at least one imaging sensitivity value of the display device.

5. The image processor of claim 1,
wherein the image enhancer is configured to correct the converted image data based on a normalization value,
wherein the gamma contrast curve selector is configured to select the at least one gamma low contrast curve if the luminance value of the generated image data is less than a first luminance associated with the at least one imaging sensitivity value,
wherein the gamma contrast curve selector is configured to select the at least one gamma high contrast curve if the luminance value is greater than a second luminance associated with the at least one imaging sensitivity value greater than the first luminance, and
wherein the image enhancer is configured to apply the selected gamma low contrast curve or the selected gamma high contrast curve to the converted and normalized image data to obtain an intermediate subset of imaging information.

6. The image processor of claim 5, wherein the normalization value is equal to the at least one imaging sensitivity value of the display device.

7. The image processor of claim 5, wherein the image enhancer is further configured to apply the selected gamma contrast curve by adding the normalization value to the intermediate subset of imaging information to obtain a gamma corrected subset of imaging information.

8. The image processor of claim 7, wherein the image enhancer is further configured to compute a maximum total value by adding the intermediate subset of imaging information with a maximum differential gain value and compute a second intermediate subset of imaging information by adding the normalization value to the intermediate subset of imaging information, and wherein the image enhancer corrects the converted image data of the captured image based on a smaller of the computed maximum total value or the computed second intermediate subset of imaging information.

9. An image processor for generating an enhanced image for display with an adjusted contrast, the image processor comprising:
an image converter configured to convert image data of a captured image from a linear domain to a logarithmic domain;

a parameter adjustment selector configured to select at least one image adjustment modifier by comparing at least one image parameter of the converted image data with at least one imaging sensitivity of a display device;

a gamma contrast curve selector configured to select at least one gamma low contrast curve when the at least one image parameter of the converted image data is less than the at least one imaging sensitivity and at least one gamma high contrast curve when the at least one image parameter of the converted image data is greater than the at least one imaging sensitivity;

an image enhancer configured to correct the converted image data of the captured image by applying the selected at least one gamma high contrast curve or the selected at least one gamma low contrast curve to the converted image data to enhance the captured image by adjusting a contrast of the converted image data based on the applied contrast curve; and an image display configured to display the enhanced captured image on the display device, wherein the parameter adjustment selector is further configured to select a first luminance adjustment modifier to attenuate a luminance of the captured image when the luminance of the captured image is less than the at least one imaging sensitivity of the display device and to select a second luminance adjustment modifier to amplify the luminance of the captured image when the luminance of the captured image is greater than the at least one imaging sensitivity of the display device.

10. The image processor of claim 9, wherein the parameter adjustment selector is configured to select the at least one image adjustment modifier to set a desired luminance level for the captured image when displayed on the display device.

11. The image processor of claim 9, further comprising:
an imaging apparatus configured to generate the image data of the captured image; and
an imaging sensitivity determiner configured to determine the at least one imaging sensitivity of the display device based on a input value of the display device that provides a predetermined output luminance at the display device.

12. The image processor of claim 11, wherein the imaging sensitivity determiner is configured to determine the at least one imaging sensitivity of the display device when the input value results in the predetermined output luminance as a set breakpoint of candela per square meter ($cd/m^2$) at the display device.

13. The image processor of claim 12, wherein the set breakpoint is 100 candela per square meter ($cd/m^2$) at the display device.

14. The image processor of claim 11, wherein the gamma contrast curve selector is configured to compare a luminance value of the converted image data with a luminance value associated with the at least one imaging sensitivity of the display device to select the at least one gamma low contrast curve or the at least one gamma high contrast curve.

15. The image processor of claim 14,
wherein the image enhancer is configured to correct the converted image data based on a normalization value,
wherein the gamma contrast curve selector is configured to select the at least one gamma low contrast curve if the luminance value of the generated image data is less than a first luminance associated with the at least one imaging sensitivity, wherein the gamma contrast curve selector is configured to select the at least one gamma high contrast curve if the luminance value is greater than a second luminance associated with the at least one imaging sensitivity greater than the first luminance, and wherein the image enhancer is configured to apply the selected gamma low contrast curve or the selected gamma high contrast curve to the converted and normalized image data to obtain an intermediate subset of imaging information.

16. The image processor of claim 15, wherein the normalization value is equal to the at least one imaging sensitivity of the display device.

17. The image processor of claim 15, wherein the image enhancer is further configured to apply the selected gamma contrast curve by adding the normalization value to the intermediate subset of imaging information to obtain a gamma corrected subset of imaging information.

18. The image processor of claim 17, wherein the image enhancer is further configured to compute a maximum total value by adding the intermediate subset of imaging information with a maximum differential gain value and compute a second intermediate subset of imaging information by adding the normalization value to the intermediate subset of imaging information, and wherein the image enhancer corrects the converted image data of the captured image based on a smaller of the computed maximum total value or the computed second intermediate subset of imaging information.

19. An image processor for generating an enhanced image for display with an adjusted contrast, the image processor comprising:
an image converter configured to convert image data of a captured image from a first imaging domain to a second imaging domain;
a gamma contrast curve selector configured to select at least one first gamma contrast curve when at least one image parameter of the converted image data is less than at least one imaging sensitivity of a display device and at least one second gamma contrast curve when the at least one image parameter of the converted image data is greater than the at least one imaging sensitivity of the display device;
an image enhancer configured to enhance the captured image for display on the display device by applying the selected gamma contrast curve to the converted image data to adjust a contrast value of the captured image based on the selected gamma contrast curve; and
a parameter adjustment selector configured to select at least one image adjustment modifier by comparing the at least one image parameter of the converted image data with the at least one imaging sensitivity of a display device.

20. The image processor of claim 19, further comprising an image display configured to display the enhanced captured image on the display device.

21. The image processor of claim 19, wherein the parameter adjustment selector is configured to select the at least one image adjustment modifier to set a desired luminance level for the captured image when displayed on the display device.

22. The image processor of claim 19, further comprising:
an imaging apparatus configured to generate the image data of the captured image; and
an imaging sensitivity determiner configured to determine the at least one imaging sensitivity of the display device based on a input value of the display device that provides a predetermined output luminance at the display device.

23. The image processor of claim 22, wherein the imaging sensitivity determiner is configured to determine the at least one imaging sensitivity of the display device when the input value results in the predetermined output luminance as a set breakpoint of candela per square meter ($cd/m^2$) at the display device.

24. The image processor of claim 23, wherein the set breakpoint is 100 candela per square meter ($cd/m^2$) at the display device.

25. The image processor of claim 19, wherein the gamma contrast curve selector is configured to compare a luminance value of the converted image data with a luminance value associated with the at least one imaging sensitivity of the display device to select the at least one first gamma contrast curve or the at least one second gamma contrast curve.

26. The image processor of claim 25,
wherein the image enhancer is configured to correct the converted image data based on a normalization value,
wherein the gamma contrast curve selector is configured to select the at least one first gamma contrast curve if the luminance value of the generated image data is less than a first luminance associated with the at least one imaging sensitivity,
wherein the gamma contrast curve selector is configured to select the at least one second gamma contrast curve if the luminance value is greater than a second luminance associated with the at least one imaging sensitivity greater than the first luminance, and
wherein the image enhancer is configured to apply the selected gamma contrast curve to the converted and normalized image data to obtain an intermediate subset of imaging information.

27. The image processor of claim 26, wherein the normalization value is equal to the at least one imaging sensitivity of the display device.

28. The image processor of claim 26, wherein the image enhancer is further configured to apply the selected gamma contrast curve by adding the normalization value to the intermediate subset of imaging information to obtain a gamma corrected subset of imaging information.

29. The image processor of claim 26, wherein the image enhancer is further configured to compute a maximum total value by adding the intermediate subset of imaging information with a maximum differential gain value and compute a second intermediate subset of imaging information by adding the normalization value to the intermediate subset of imaging information, and wherein the image enhancer corrects the converted image data of the captured image based on a smaller of the computed maximum total value or the computed second intermediate subset of imaging information.

30. The image processor according to claim 19, wherein the parameter adjustment selector is further configured to select a first luminance adjustment modifier to attenuate a luminance of the captured image when the luminance of the captured image is less than the at least one imaging sensitivity of the display device and to select a second luminance adjustment modifier to amplify the luminance of the captured image when the luminance of the captured image is greater than the at least one imaging sensitivity of the display device.

31. The image processor according to claim 19, wherein the first imaging domain is a linear domain and the second imaging domain is a logarithmic domain.

32. The image processor according to claim 19, wherein the at least one first gamma contrast curve is a gamma low contrast curve and the at least one second gamma contrast curve is a gamma high contrast curve.

\* \* \* \* \*